(12) United States Patent
Kaeser (10) Patent No.: US 9,164,982 B1
(45) Date of Patent: Oct. 20, 2015

(54) METHODS AND APPARATUS FOR AUTOMATICALLY GENERATING TEXT

(75) Inventor: Alain Kaeser, Paris (FR)

(73) Assignee: YSEOP SA, Lyons (FR)

( * ) Notice: Subject to any disclaimer, the term of this patent is extended or adjusted under 35 U.S.C. 154(b) by 780 days.

(21) Appl. No.: 13/465,261

(22) Filed: May 7, 2012

Related U.S. Application Data (62) Division of application No. 12/323,140, filed on Nov. 25, 2008.

(51) Int. Cl.
*G06F 17/00* (2006.01)
*G06F 17/28* (2006.01)

(52) U.S. Cl.
CPC ...................... *G06F 17/28* (2013.01)

(58) Field of Classification Search
CPC .... G06F 17/21; G06F 17/30719; G06F 17/28
USPC ......................................... 715/254, 256, 200
See application file for complete search history.

(56) References Cited

U.S. PATENT DOCUMENTS

| | | | |
|---|---|---|---|
| 5,819,264 A * | 10/1998 | Palmon et al. | 1/1 |
| 8,150,676 B1 | 4/2012 | Kaeser | |
| 8,630,844 B1 * | 1/2014 | Nichols et al. | 704/9 |
| 2002/0095411 A1 * | 7/2002 | Caldwell et al. | 707/5 |
| 2004/0225651 A1 | 11/2004 | Musgrove et al. | |
| 2006/0009991 A1 | 1/2006 | Jeng et al. | |
| 2006/0074671 A1 * | 4/2006 | Farmaner et al. | 704/257 |
| 2006/0178868 A1 * | 8/2006 | Billerey-Mosier | 704/9 |
| 2007/0169021 A1 | 7/2007 | Huynh et al. | |
| 2008/0097951 A1 | 4/2008 | Gupta et al. | |
| 2008/0177689 A1 | 7/2008 | Jeng et al. | |
| 2008/0275694 A1 * | 11/2008 | Varone | 704/9 |

FOREIGN PATENT DOCUMENTS

| | | |
|---|---|---|
| FR | 2848689 A1 | 6/2004 |
| WO | WO 88/08160 A1 | 10/1988 |
| WO | WO 00/29977 A1 | 5/2000 |
| WO | WO 02/086706 A1 | 10/2002 |
| WO | WO 05/029222 A2 | 3/2005 |
| WO | WO 06/068731 A2 | 6/2006 |

OTHER PUBLICATIONS

Steven Holzner, Inside XSLT, Jul. 20, 2001, QUE, pp. 328, 363, 366-369.
Tokenize a String, Rosetta Code, Feb. 8, 2007, pp. 1-2.

* cited by examiner

*Primary Examiner* — Scott Baderman
*Assistant Examiner* — Howard Cortes
(74) *Attorney, Agent, or Firm* — Wolf, Greenfield & Sacks, P.C.

(57) ABSTRACT

Some embodiments relate to identifying grammatical errors in text that has been automatically generated from a template. The text may be scanned to identify, for example, errors in punctuation, spacing, and capitalization. When an error in the text is identified, it may be corrected. Some embodiments relate to automatically formatting lists in text that is generated from a template. For example, a template may include a tag that specifies a list of elements. A formatting parameter may be determined that specifies whether to format the list as an enumerated list or a textual sentence. Output text may then be generated that includes the list in the proper format.

20 Claims, 5 Drawing Sheets

METHODS AND APPARATUS FOR AUTOMATICALLY GENERATING TEXT

RELATED APPLICATION

This Application claims the benefit under 35 U.S.C. §120 and is a divisional (DIV) of U.S. application Ser. No. 12/323,140, entitled "METHODS AND APPARATUS FOR AUTOMATICALLY GENERATING TEXT" filed on Nov. 25, 2008, which is herein incorporated by reference in its entirety.

TECHNICAL FIELD

The present invention relates to automatically generating human-language text.

BACKGROUND

Natural language generation is the automatic generation of human language text (i.e., text in a human language) based on information in non-linguistic form. For example, natural language generation techniques may be used to automatically create a textual description of a day of trading of a particular stock based on data indicating the change in stock price throughout the day, to automatically generate a confirmation e-mail for an online purchase made via the Internet from data describing the purchase, to generate real-time comments about a sporting event using data about the game or for numerous other applications.

SUMMARY

One embodiment is directed to a method for automatically generating text that comprises acts of: accessing at least one template that includes at least one grammatical tag that implicates at least one actor in a sentence in the template; accessing at least one parameter that specifies at least one characteristic of the at least one actor; determining human-language text based on the at least one grammatical tag and the at least one parameter; and automatically generating output text in a human-readable language based on the at least one template and the determined human-language text. Another embodiment is directed to at least one computer readable medium encoded with instructions that, when executed on a computer system, perform the above-described method.

A further embodiment is directed to a computer system comprising: at least one memory; and at least one controller, coupled to the at least one memory, that: accesses, from the at least one memory, at least one template that includes at least one grammatical tag that implicates at least one actor in a sentence in the template; accesses, from the at least one memory, at least one parameter that specifies at least one characteristic of the at least one actor; determines human-language text based on the at least one grammatical tag and the at least one parameter; and automatically generates output text in a human-readable language based on the at least one template and the determined human-language text.

Another embodiment is directed to a method for automatically generating text that comprises acts of: accessing human-language text automatically generated using at least one template that includes at least some fixed text and at least one tag that serves as a placeholder to be filled in with automatically generated text; scanning the human-language text to identify at least one grammatical error, wherein the at least one grammatical error comprises at least one of: a punctuation error, a spacing error, or a capitalization error; in response to identifying the at least one grammatical error, determining a correction for the at least one grammatical error; and using the received human-language text to automatically generate output text that includes the correction. A further embodiment is directed to at least one computer readable medium encoded with instructions that, when executed on a computer system, perform the above-described method.

Another embodiment is directed to a method for automatically generating text that comprises acts of: accessing a template that includes at least one tag that specifies at least one list of elements; determining at least one formatting parameter for the at least one list of elements, wherein the at least one formatting parameter specifies whether the list is to be formatted as an enumerated list or as a textual sentence; and determining, based on the formatting parameters, a format for the at least one list of elements; and using the at least one list of elements and the determined format to automatically generate output text that includes the at least one list of elements formatted according to the determined format. A further embodiment is directed to at least one computer readable medium encoded with instructions that, when executed on a computer system, perform the above-described method.

BRIEF DESCRIPTION OF THE DRAWINGS

Aspects of the invention are described with reference to illustrative embodiments and the following drawings in which like reference characters represent like elements, and wherein.

DETAILED DESCRIPTION

Prior art techniques for natural language generation can be divided into two general categories. The first of these categories is template-based techniques. In systems that employ template-based techniques, a template processor is programmed to insert portions of input data into blanks or tags in pre-defined templates. The inventor has appreciated that, while systems using such template processors are relatively easy to implement, they provide little flexibility because the content of the template is pre-defined and static. In addition, the inventor has appreciated that it is difficult to take grammatical context (e.g., verb tense, subject-verb agreement, gender-specific pronouns, possessive pronouns, proper use of articles) into account using such prior art templates, and have appreciated that such templates do not allow for variations in style or tone based on the intended audience of the generated text. As such, prior art template-based techniques often require defining a large number of templates (many of which may be very similar) to provide for different styles, tones, and to account for grammatical context. As one simple example, a template for a confirmation e-mail for an online purchase may include the sentence shown in Table 1 below, where <product name> is a blank to be filled in by the template processor by inserting the name of a product purchased by the recipient of the e-mail.

TABLE 1

Thank you for your purchase of a <product name>.

The statement in Table 1 is grammatically correct only if the product name begins with a consonant. If the product name begins with a vowel, the statement should read, "Thank you for your purchase of an <product name>." Thus, an additional template may have to be defined that includes the sentence "Thank you for your purchase of an <product name>," to be used in situations in which the purchased product is a vowel.

Some prior art template-based techniques allow control structures (e.g., if-then-else statements or loops) to be included in a template, which may be used to reduce the number of templates that need be pre-defined. For example, in the example of Table 1 above, an if-then-else statement may be used to insert an "a" before the product name if the product name begins in a consonant and an "an" before the product name if the product name begins in a vowel. However, even if such control structures are used, different templates may still need to be defined for different styles, tones, and grammatical contexts.

The second category of techniques for natural language generation is one using linguistic-based techniques. Systems that implement such techniques do not rely on templates, but rather use large and complex computer-readable specifications that describe how to use language. Algorithms are defined for determining, from input data, the content of what the generated text should say and for using the specifications to determine which words to use to say it. The inventor has appreciated that, while systems that employ linguistic-based techniques provide greater flexibility than template based-techniques and can take grammatical context into account, these systems are complex to design and maintain. Moreover, different algorithms typically must be designed for each type of data from which the system is to generate text.

Some embodiments described herein address some of the above-described deficiencies of template-based techniques and linguistic-based techniques for natural language generation. However, not every embodiment addresses every deficiency of each of these techniques and the invention is not limited to addressing all or even any of these deficiencies.

Some embodiments relate to automatically generating human language communications using templates, but wherein the templates include tags that relate to roles performed by actors and can provide flexibility not achievable using conventional templates. The inventor has appreciated that, when automatically generating a communication (e.g., a letter, an e-mail, or other communication), the communication can be conceptualized as an interaction between two or more parties. For example, a communication can be thought of as an interaction between the sender or senders of the communication, the recipient or recipients of the situation, and/or potentially one or more third parties referred to in the communication. The inventor has further appreciated that, in many situations, using proper grammar in automatically generating a human language communication depends on characteristics of the actors. For example, proper subject-verb agreement may depend on whether a particular actor is singular or plural and/or the gender of a particular actor. Thus, some embodiments relate to the automatic generation of human language communications using templates with tags that serve as placeholders for text to automatically be generated, and in which at least some of the tags indicate that the text to be generated is dependent on one or more characteristics of an actor. This may be done in any suitable way, as the invention is not limited in this respect. In this manner, in some embodiments, grammatically proper text may be automatically generated using templates so that fewer generalized templates can be used than in conventional template systems, and without the complexity of implementing a full linguistic language generator.

Figure 1:
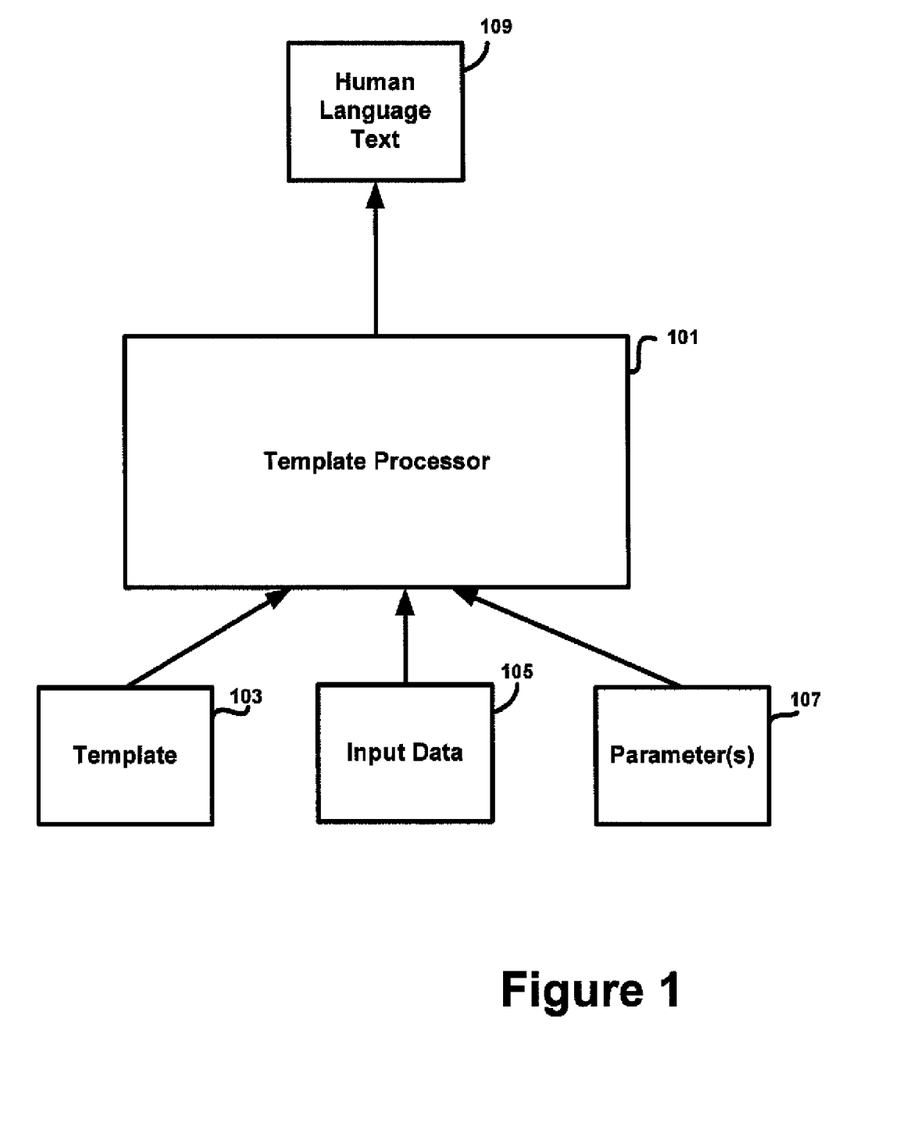
FIG. 1 is a block diagram of a system for automatically generating human-language text using a template, in accordance with some embodiments.

In some embodiments, for example, the system shown in FIG. 1 may be used. In the system shown in FIG. 1, a template processor 101 accesses a template 103, input data 105, and parameters 107, and uses these inputs to automatically generate human language text 109. Template 103 is a template for generating text. The template may have tags, blanks, or other indicia to indicate places in the template that the template processor is to fill in with text. Input data 105 includes information that the template processor may use in generating and/or determining text to fill in the blanks or tags in the template. For example, if template 103 is a template for an e-mail confirmation of an online purchase, input data 105 may include information that describes the online purchase (e.g., the date of the purchase, the item(s) purchased, the amount of the purchase, or other information) that is used to generate and/or determine the text to be filled into the tags or blanks of template 103.

As discussed above, some of the tags may be grammatical tags that indicate that the text to be generated and/or determined is dependent on the characteristics of an actor that plays a role in the text to be generated. Parameters 107 may specify one or more characteristics of the actors that template processor 101 may use to generate and/or determine the grammatically proper text for these tags.

Figure 2:
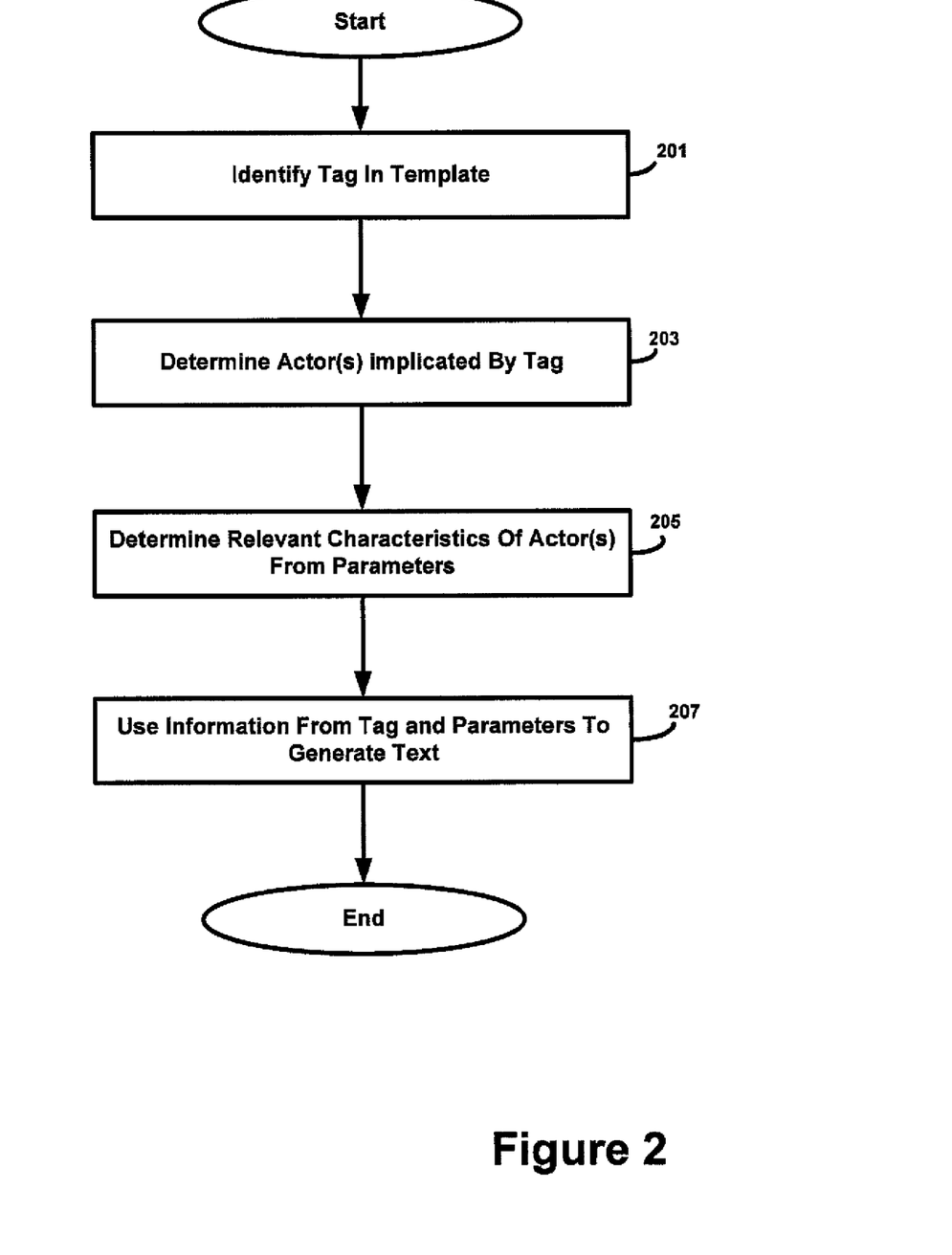
FIG. 2 is a flow chart of an illustrative process for automatically generating human-language text using a template having grammatical tags, in accordance with some embodiments.

FIG. 2 shows an example of a process that template processor 101 may use in some embodiments to generate and/or determine text for a grammatical tag, in a template, that is dependent on one or more characteristics of an actor. The process begins at act 201, where template processor 101 accesses a template and identifies such a tag in a template. The process then continues to act 203, where template processor 101 determines the actor or actors that are implicated by the tag. The process next continues to act 205 where template processor 101 determines the relevant characteristics of the implicated actor or actors from one or more parameters 107. The process then continues to act 207 where the template processor 101 uses information specified by the tag and the information from parameters 107 to generate and/or determine the text. Text may be determined or generated in any suitable way, as the invention is not limited in this respect. For example, text may be generated using a look-up table, a list, a dictionary, a linguistic model or tree, or in any other suitable way. Thus, as used herein, "generating text" means producing the text using any suitable source or technique.

In some embodiments, the process of FIG. 2 may be repeated for each grammatical tag in the document.

The one or more tags in template 101 that indicate that the text to be generated and/or determined is dependent on the one or more characteristics of an actor may take any suitable form and may be used to address any suitable grammatical issue, as the invention is not limited in this respect. In some embodiments, such tags may be used to implement proper subject-verb agreement and proper verb conjugation.

For example, one example of a tag that may be used to implement proper subject-verb agreement is a SenderAction tag. The sentence shown in Table 2 below is an example of a sentence that includes a SenderAction tag. The SenderAction tag specifies a verb (i.e., an action) that is performed by the sender of a communication. In the example shown in Table 2 below, the verb specified by the SenderAction tag is "appreciate." When template processor 103 encounters this tag, it will conjugate the verb "appreciate" depending on whether the sender is singular or plural, as specified by one or more parameters 107.

TABLE 2

SenderAction(appreciate) your business.

Thus, for example, if one or more parameters 107 indicate that the sender is singular, template processor 101 may generate text that reads "I appreciate your business," whereas if the parameter(s) 107 indicate that the sender is plural, template processor 101 may generate text that reads "We appreciate your business."

Other examples of tags that may be used to implement subject-verb agreement and proper verb conjugation are a RecipientAction tag which specifies a verb that is performed by the recipient of the letter, a SenderRecipientAction tag which specifies a verb performed by the sender, where the recipient is the indirect object of the verb, and a Recipient-SenderAction tag which specifies a verb performed by the recipient, where the sender is the indirect object of the verb.

For example, the template sentence "RecipientAction(recommend) purchasing ten units," may be used by the template processor to generate text that reads "You recommend purchasing ten units." In English, the plural of "you" is the same as the singular of "you," such that when generating text in English, parameter(s) 107 need not be used to determine whether the recipient is singular or plural. However, in other languages, the plural of "you" is different from the singular, such that parameter(s) 107 may be used to determine whether the plural or singular form of "you" should be used, and to determine the appropriate conjugation of the verb. In this respect, it should be appreciated that the grammatical tags described herein are not limited to generating text in English or in any other particular human language. Rather, these tags may be used to generate text in any suitable language, and the invention is not limited in this respect.

An example template sentence that uses the SenderRecipientAction tag is the sentence, "SenderRecipientAction(write) because the deadline is soon approaching." If parameter(s) 107 specify that the sender is singular, the template processor may use this sentence to generate the text, "I write you because the deadline is soon approaching," whereas if parameter(s) 107 specify that the sender is plural, the template processor may use this sentence to generate the text, "We write you because the deadline is soon approaching." As discussed above, in English the number of the recipient need not be taken into account because the singular and plural of "you" are the same. However, in other languages in which the singular and plural of "you" are different, the template processor 101 may determine the number of the recipient from parameters 107 and, based on this, may insert either the singular or plural of "you" as the indirect object of the verb.

An example template sentence that uses the RecipientSenderAction tag is the sentence, "RecipientSenderAction(give) many reasons to purchase these units." Template processor 101 may generate the text, "You give me many reasons to purchase these units," from this sentence if parameter(s) 107 indicate that the sender is singular, and may generate the text, "You give us many reasons to purchase these units," if the sender is plural.

In the examples of tags described above, the tags specify a verb to be conjugated by the template processor based on one or more characteristics of the actor(s) performing the verb. In some embodiments, tags may specify information in addition to the verb to be conjugated. Any other suitable information may be specified, as the invention is not limited in this respect. For example, in some embodiments, a tag may specify the tense in which the verb is to be conjugated by the template processor, the voice of the verb (e.g., active or passive), and/or any other suitable information. Template processor 101 may use this information to conjugate the verb in the appropriate tense and/or voice. Thus, for example, in some embodiments, the SenderAction tag may take the form SenderAction(verb, tense, voice), such that a tag in a template that reads, for example, SenderAction(tell, simple past, passive) may be processed by template processor 101 to generate the text, "I was told," if the parameter(s) 107 indicate that the sender is singular, or "We were told," if the parameter(s) 107 indicate that the sender is plural.

The examples of tags described above are tags that relate to actions performed by either a sender or a recipient of a communication. However, the aspects of the invention that relate to the use of tags to properly conjugate verbs and to implement proper subject-verb agreement are not limited to actions performed by the sender or recipient of a communication and are not limited to use with the automatic generation of communications as these aspects may be used in connection with actions performed by actors who are not the sender or recipient of a communication and/or may be used in connection with the generation of text that is not part of a communication.

For example, in some embodiments, tags may be used that relate to actions performed by actors who are not the sender or recipient of a communication. Such tags may be used as general purpose tags and need not be used in templates for communications between one or more senders and one or more recipients. One example of such a tag is the ThirdAction tag, which specifies an actor (i.e., the subject of a verb), a verb that indicates an action performed by the actor, and a tense of a verb. Parameter(s) 107 may specify characteristics of the actor, such as, for example whether the actor is singular or plural and/or the gender of the actor. Template processor 101 may use the information specified by the tag and parameter(s) 107 to generate the correct subject and the correct conjugation of the verb.

Thus, for example, template processor 101 may process the template sentence, "ThirdAction(Purchaser, buy, past) too much inventory last year," to generate the text, "He bought too much inventory last year," if parameter(s) 107 indicate that the actor Purchaser is singular and male. If parameter(s) 107 indicate that Purchaser is singular and female, template processor may generate the text, "She bought too much inventory last year," and if parameter(s) 107 indicate that Purchaser is plural, template processor 101 may generate the text, "They bought too much inventory last year."

Another example of a tag that may be used for actions performed by a third party (i.e., an actor who is not the sender or recipient of a communication) is the ThirdThirdAction tag. This tag may be used to indicate an action performed by a third party, where another third party is the indirect object of that action. The ThirdThirdAction tag may specify the actor that is the subject of the sentence (i.e., the actor performing the action), the actor that is the indirect object of the sentence, the verb, and the verb tense. Thus, for example, template processor 101 may process the template sentence, "ThirdThirdAction(Seller, Purchaser, sell, present) corn," to generate the text, "He sells him corn," if parameter(s) 107 indicate that the actor Seller is singular and male and the Purchaser is singular and male. If the Seller is singular and female, template processor 101 generates the subject of the sentence as "She" instead of "He." Similarly, if parameter(s) 107 indicate that Purchaser is singular and female, template processor 101 generates the indirect object of the sentence as "her" instead of "him." If parameter(s) 107 indicate that the Seller is plural, template processor generates the subject of the sentence as "they" and conjugates the verb "sell" to agree with the plural subject (i.e., such that the subject and verb read "they sell" instead of "he sells"). If parameter(s) 107 indicate that the Purchaser is plural, template processor 101 generates the indirect object "them" instead of "him" or "her").

In some embodiments, tags may be used to generate appropriate pronouns dependent on the identity and/or characteristics of the actor identified in the tag. For example, the SenderPossessive tag may be used to specify the possessive pronoun of the sender. Thus, when template processor 101 encounters the SenderPossessive tag, it may generate the text "my" if parameter(s) 107 indicate that the sender is singular and may generate the text "our" if the sender is plural. Similarly, when template processor 101 encounters a RecipientPossessive tag, it may generate the possessive pronoun for the recipient (which, in English, is "your" for both singular and plural, though the singular and plural forms may be different from each other in other languages).

Other examples of tags that may be used to generate appropriate pronouns are the SenderSubject tag which may be used to generate the personal subjective pronoun of the sender (e.g., "1" or "We" depending on whether the subject is singular or plural), and the RecipientSubject tag which may be used to generate the personal subjective pronoun of the recipient (e.g. "You" for both singular and plural in English, but different words in other languages).

The examples of tags described above are tags that relate to actions performed by either a sender or recipient of a communication. However, the aspects of the invention that relate to the use of tags to select and to implement correct pronouns are not limited to pronouns for the sender or recipient of a communication and are not limited to use with the automatic generation of communications as these aspects may be used in connection with pronouns for actors who are not the sender or recipient of a communication and may be used in connection with the generation of text that is not part of a communication.

In some embodiments, a ThirdPossessive tag that specifies a third party actor may be used to generate the possessive pronouns for an actor, a DemonstrativeNear tag may be used to generate the near demonstrative pronoun (i.e., "this" or "these") for a noun, the DemonstrativeFar tag may be used to generate the far demonstrative pronoun (i.e., "that" or "those") for a noun, and the ThirdDirectObject tag that specifies an actor may be used to generate the direct object pronoun (e.g., "him," "her," or "them") for the actor.

For example, template processor 101 may process the tag ThirdPossessive(Colleague) to generate the text "his," "her," or "their," depending on whether parameter(s) 107 indicate that Colleague is singular or plural and/or male or female. Similarly, template processor 101 may process the tag DemonstrativeNear(Friends) to generate either the text "this" or "these" based on whether parameter(s) 107 and/or input data 105 indicate that the list "Friends" includes one element or multiple elements, and may process the tag DemonstrativeFar(Friends) to generate either the text "that" or "those" based on whether parameter(s) 107 and/or input data 105 indicate that the list "Friends" has one element or multiple elements.

In some embodiments, the parameter specified by the DemonstrativeNear and/or DemonstrativeFar tag (i.e., "Friends" in the examples above) may be an actor specified in parameter(s) 107 or a list of actors or elements that is specified in parameter(s) 107 or input data 105. If there is more than one actor or element in the list, the template processor 101 may determine that the plural form of the pronoun is to be used, whereas if there is only one actor or element in the list, template processor 101 may determine that the singular form of the pronoun is to be used.

Another type of tag that may be used in some embodiments is an agreement tag, which may be used to specify whether a noun should be singular or plural. For example, an agreement tag may take the form Agree(object, count), where object is the noun to be used and count is the number of that object. Thus, for example, template processor 101 may process the tag Agree(accessory, 1) to generate the text "accessory," and may process the tag Agree(accessory, 3) to generate the text "accessories." The inventor has appreciated that the Agree tag may be useful in situations in which the count is not to known at the time the template is written. For example, in some embodiments, the count specified by such a tag may refer to the size of a list of actors or elements in parameter(s) 107 or input data 105. Thus, for example, template processor 101 may process the tag Agree(accessory, AccessoryList.size) based on the number of elements in a list named in AccessoryList in parameter(s) 107 or input data 105.

Another type of tag that may be used is a tag the implements proper use of indefinite articles. Such a tag may be useful, for example, when the word that immediately follows an indefinite article is not know at the time the template is written. Thus, for example, template processor 101 may process the tag indefArticle( ) to generate either the text "a" or the text "an" depending on whether the word immediately following the article begins with a consonant or a vowel.

As discussed above, parameter(s) 107 may include information that template processor 101 may use to determine the appropriate text with which to replace a grammatical tag. Parameter(s) 107 may specify any suitable information and may specify this information in any suitable way, as the invention is not limited in this respect.

For example, in some embodiments, parameter(s) 107 may include information about each actor referenced in the tags of template 103. Any suitable information may be included about an actor, as the invention is not limited in this respect. For example, in some embodiments, the information about an actor may include the name of the actor, the address of the actor (which may be used, for example, in automatically generating addresses for communications between a sender and recipient), the number of the actor (e.g., singular or plural), the gender of the actor, and/or any other suitable information.

In some embodiments, parameter(s) 107 may also include one or more global parameters that template processor 101 may apply throughout an entire document to be generated. Any suitable global parameter(s) may be used, as the invention is not limited in this respect. For example, in some embodiments, the global parameters may include a parameter that specifies a default verb tense to be used in instances where a tag does not specify a particular verb tense. In some embodiments, parameter(s) 107 may include a global parameter that specifies whether the majestic plural (also referred to as the "Royal We") is to be used. If the parameter indicates that the majestic plural is to be used, then the first person plural is used throughout the document, even if parameter(s) 107 indicate that the actor (e.g., the sender of a communication) is singular. Another example of a global parameter that may be used is a parameter that indicates whether the style of text is to be formal or informal. That is, for example, some languages, such as French, Spanish, and Italian, have an informal and formal version of the word "you" and its various singular, plural, and possessive forms. Such a global parameter may be used to is indicate whether the formal or informal version should be used. Another example of a global parameter that may be used in some embodiments is a parameter that specifies the language in which template processor 101 is to generate text. As discussed above, any other suitable global parameter may be used.

Figure 3:
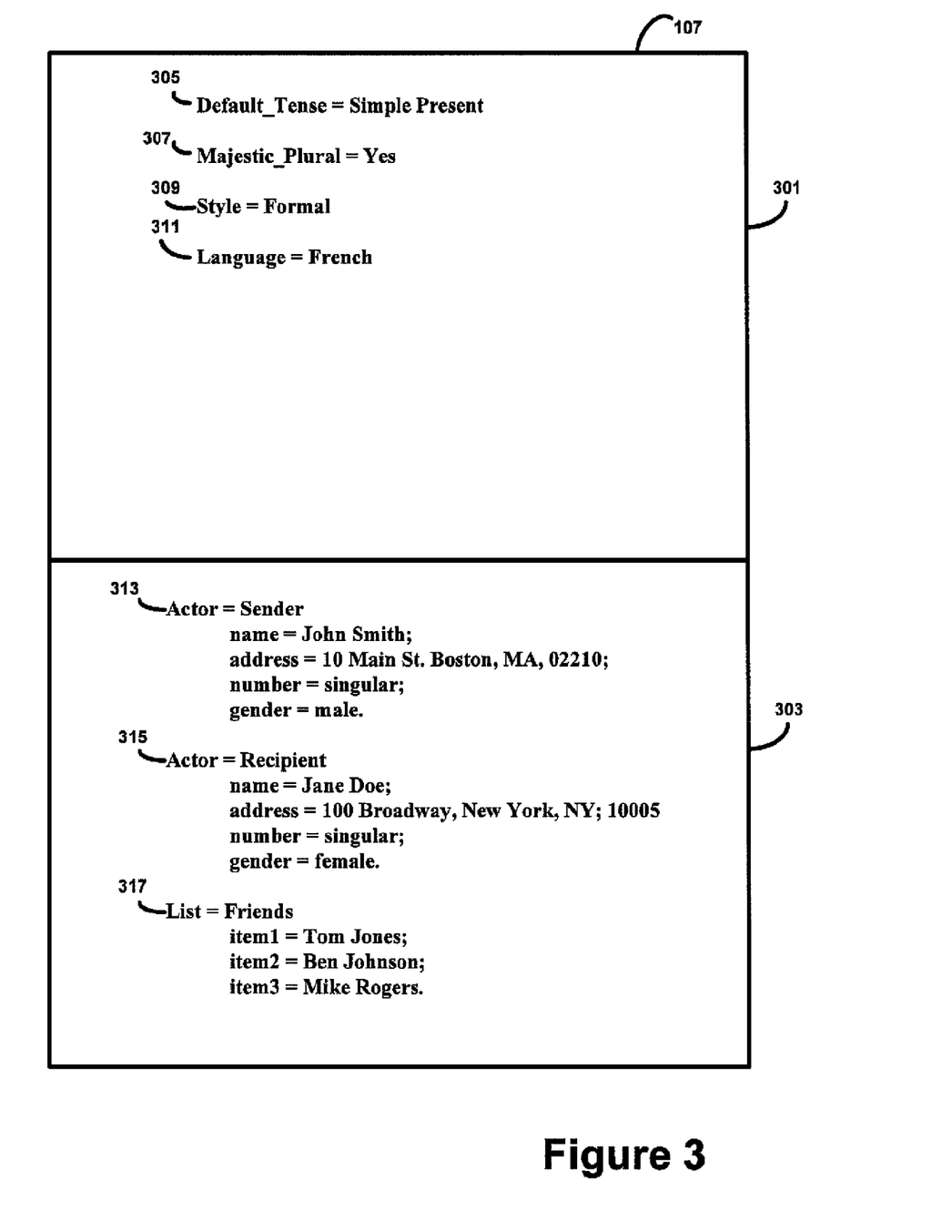
FIG. 3 is a diagram of parameters for use by a template processor in processing grammatical tags, in accordance with some embodiments.

As discussed above, parameter(s) 107 may specify the information used by template processor 101 in any suitable way and in any suitable format, as the invention is not limited in this respect. FIG. 3 shows an example of parameters 107 that may be used, in some embodiments, by template processor 101 to generate human-language text. As shown in FIG. 3, parameters 107 includes global parameters 301 and actor parameters 303. Global parameters 301 include a parameter 305 that indicates a default verb tense, a parameter 307 that indicates whether the majestic plural should be used, a parameter 309 that indicates whether the style of the document is informal or formal, and a parameter 311 that indicates in which language the text is to be generated.

Actor parameters 303 include information about the characteristics of actors. For example, actor information 313 includes information about the Sender, such as the Sender's name, address, number, and gender, and actor information 315 includes information about the Recipient, such as the Recipient's name, address, number, and gender. Also included in the example of FIG. 3 is a list 317 named Friends that includes three elements. As discussed above, lists defined by parameters 107 may be used by template processor in generating text with which to replace certain tags.

The parameters shown in FIG. 3 are only a few examples of the types of parameters that may be used, and the invention is not limited to use with these parameters. In addition, the parameters described above are provided to the template processor via parameters 107. However, the invention is not limited in this respect, as the above-discussed parameters may be provided to the template processor in any suitable way. For example, some parameters may be included in input data 105. In this respect, it should be appreciated that input data 105 and parameters 107 are interchangeable. That is, any information included in parameters 107 may also be provided to the template processor via input data 105 and any information included in input data 105 may be provided to the template processor via parameters 107.

The inventor has appreciated that templates that include grammatical tags (such as those described above), non-grammatical tags (e.g., tags to be filled in using information from input data 105), and/or control structures (e.g., if-then-else statements and/or loops) may, in some situations, become complex, as there are a large number of possible outputs that a template processor could generate from the template. In addition, in some situations, control structures in templates may refer to other templates such that part of the text generated by the template processor comes from one template and part of the text generated by the template processor comes from a different template. Indeed, in some situations, different parts of the same sentence may come from different template documents. The inventor has appreciated that this complexity presents challenges for the writer or writers of a template or set of templates to design the template such that the template processor will generate text that properly uses capitalization and punctuation for all possible outputs. Moreover, the inventor has appreciated that in templates that include one or more control structures and/or grammatical tags, the writer of the template may use spacing in the template (e.g., spaces, tabulations, and/or line breaks) to make the template easier to read and work with. However, such spacing used by the template writer may result in improper spacing in the text generated by the template processor.

Thus, the inventor has appreciated that writing a template from which the template processor will generate text having correct capitalization, punctuation, and spacing may be complex and may be burdensome for the writer of the template. Thus, some embodiments relate to performing post-generation analysis of the text generated by the template processor to correct capitalization, punctuation, and spacing errors in the generated text. In this manner, a template writer need not be concerned with designing a template which will result in correct capitalization, punctuation, and spacing for all possible outputs, as these types of errors may be corrected after the text is generated. This may be done in any suitable way, as the invention is not limited in this respect.

Figure 4:
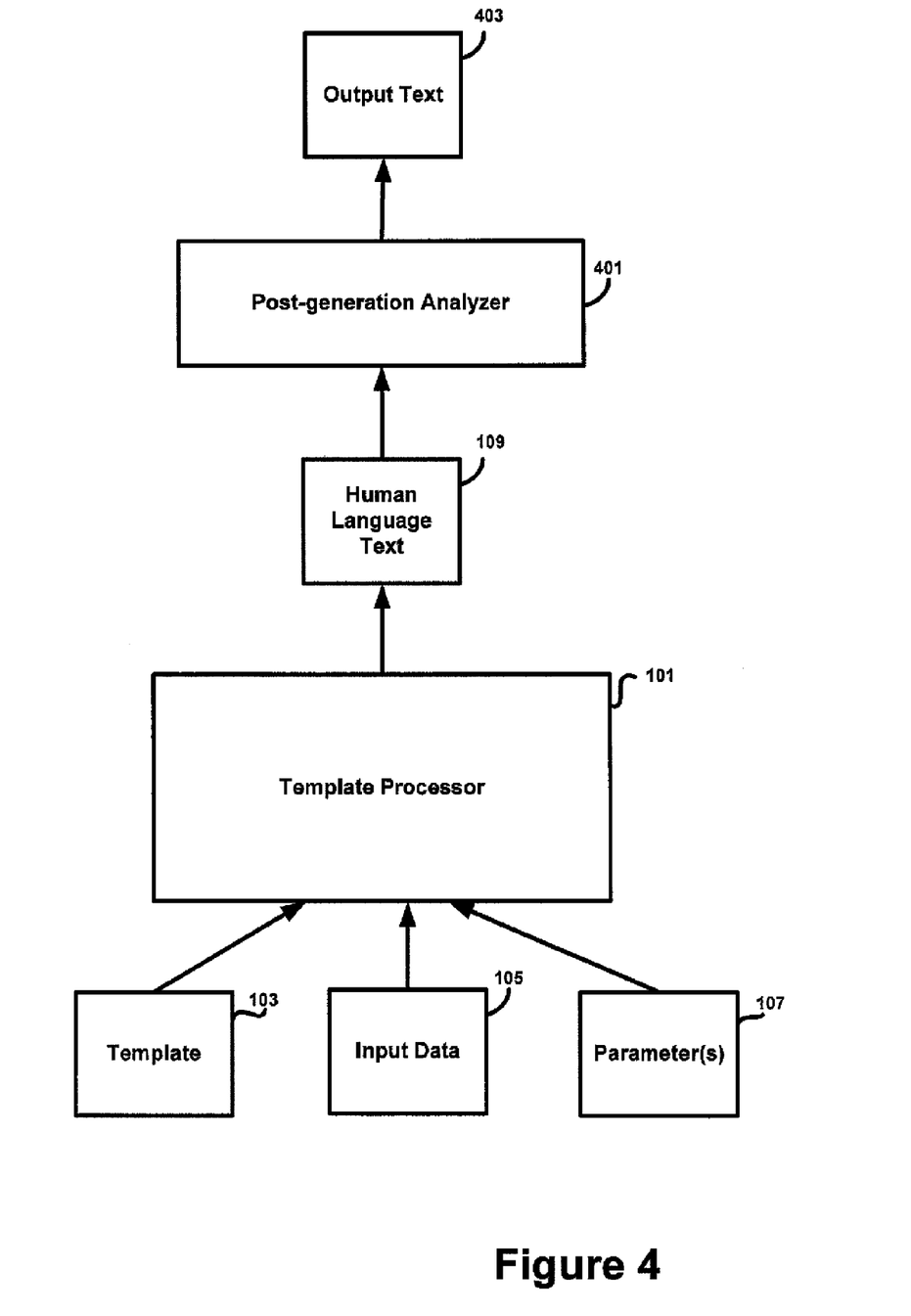
FIG. 4 is a block diagram of a system for performing post-generation grammatical analysis of text generated by a template processor, in accordance with some embodiments.

For example, as shown in FIG. 4, template processor 101 may generate human-language text 109 using template 103, input data 105, and parameter(s) 107. The human-language text 109 generated by the template processor may then be provided as input to post-generation analyzer 401 which may analyze the generated text, identify and correct grammatical errors in the text, and output corrected text 403.

Post-generation analyzer 401 may identify and correct any suitable type or types of grammatical errors, as the invention is not limited in this respect. For example, in some embodiments, the post-generation analyzer may identify and correct errors in punctuation. This may be done in any suitable way, as the invention is not limited in this respect. For example, in some embodiments, post-generation analyzer may identify repeated punctuation marks, such as, for example, two consecutive periods (that may or may not be separated by one or more blank spaces), and may remove one of these duplicate punctuation marks from the text. Post-generation analyzer 401 may identify and correct other types of punctuation errors, such as, for example verifying that each sentence ends with a period and verifying that each colon has the proper spacing. That is, for example, English grammar specifies that each colon be followed by a single space and not preceded by any spaces, while French grammar specifies that each colon be preceded and followed by a space. Thus, in some embodiments, post-generation analyzer 401 may identify and correct errors in the spacing for colons based on the language in which the text is generated.

In some embodiments, post-generation analyzer 401 may identify and correct capitalization errors in the generated text. This may be done in any suitable way, as the invention is not limited in this respect. For example, post-generation analyzer 401 may analyze the generated text to verify that the first letter of each sentence is capitalized. If post-generation analyzer 401 identifies a sentence in which the first letter is not capitalized, it may correct the sentence by replacing the first letter with a capital letter.

In some embodiments, post-generation analyzer 401 may identify and correct spacing errors between words. This may be done in any suitable way, as the invention is not limited in this respect. For example, in some embodiments, post-generation analyzer 401 may identify extra spaces between words, extra tabulations, and extra line breaks, and may remove this extraneous spacing from the generated text.

In some embodiments, post-generation analyzer 401 may identify instances of a word or phrase that appear multiple times within close proximity of each other and may automatically replace one or more instances of this word or phrase in the generated text with a synonym. For example, in the sentence, "I bought a barge and painted the barge green," it may desirable for stylistic reasons not to use the word "barge" twice, but rather to use a synonym for barge in place of the second instance of the word. For example, the sentence may read better if it instead says, "I bought a barge and painted the vessel green." The inventor has appreciated that, because template processor may generate different sentences or sentence fragments using different templates, determining whether the same word or phrase may appear multiple times in close proximity in the automatically generated text may present challenges to a template writer. Thus, in some embodiments, post-generation analyzer 401 may identify repeated words that are within close proximity of each other and substitute repetitions of one or more instances of these words with synonyms. This may be done in any suitable way, as the invention is not limited in this respect.

For example, in some embodiments, the use of synonyms may be controlled by the writer of a template by using a synonym tag. This may be done in any suitable way, as the invention is not limited in this respect. For example, in some embodiments, a template writer may include a synonym tag in a template sentence for a word that he or she believes might be repeated in the automatically generated text. The synonym tag may specify one or more synonyms for a particular word. For example, a template sentence using a synonym tag may recite, "I bought a synonym ("barge", "vessel", "ship")." When post-generation analyzer 401 identifies a synonym tag in the generated text, it may determine if there are any other uses of the words specified in the synonym tag within close proximity of the tag. If there are no other uses of these words in close proximity, the post-generation analyzer may select one of the words or phrases specified in the tag to use. The post-generation analyzer may select the synonym to use in any suitable way, as the invention is not limited in this respect. For example, in some embodiments, if there are no other uses of any of the specified words in close proximity, the post-generation analyzer may select the first word or phrase in the list and may replace the synonym tag with this word in the output text.

If post-generation analyzer 401 determines that there are other uses of one or more of the words or phrases specified in the synonym tag within close proximity, post-generation analyzer 401 may select a word or phrase from the list that is not used within close proximity and may replace the synonym tag with the selected word in the output text. For example, if the word "barge" appears in close proximity to the illustrative synonym tag described above, the post-generation analyzer may select one of the other terms specified in the synonym tag (i.e., either "vessel" or "ship") to use in the output text. If there are multiple words or phrases specified in the synonym tag that are not used within close proximity of the tag, post-generation analyzer 401 may select one of them to use in the output text and may make the selection in any suitable way, as the invention is not limited in this respect. For example, in some embodiments, post-generation analyzer 401 may select the first term in the list that is not used within close proximity and may use this term in the output text.

As an example, if post-generation analyzer 401 encounters the sentence, "I bought a synonym("barge", "craft", "ship") and I painted the synonym("barge", "vessel") green," the post-generation analyzer may first identify the first synonym tag in the sentence and may determine that none of the terms in the synonym tag are used within close proximity of the tag. Thus, it may replace the tag with the term "barge." The post-generation analyzer may then encounter the second synonym tag in the sentence and may determine that the term "barge" is used within close proximity because this term was selected to replace the first synonym tag in the first part of the sentence. Thus, the post-generation analyzer may select the term "vessel" from this tag to replace the second synonym tag in the sentence. Thus, the text output by the post-generation analyzer may read, "I bought a barge and I painted the vessel green."

In the examples above, post-generation analyzer determines whether a word or phrase is used in close proximity to another instance of the same word or phrase. Any suitable threshold may be used to determine whether a word or phrase is in close proximity. For example, in some embodiments, a word or phrase may be determined to be in close proximity to another word or phrase if it is in the same sentence or paragraph. In other embodiments, a word or phrase may be determined to be in close proximity to another word if it is within a threshold number of characters or words of the other word. Any suitable threshold number may be used, such as for example, 10 words, 20 words, 30 words, 50 characters, 100 characters, or any other suitable number of words or characters.

Some embodiments relate to the automatic enumeration of elements in a list. The inventor has appreciated that the format in which it is desired to output a list may depend on the size of the list. For example, the inventor has appreciated that if the size of the list is small, it may be desired to output the list in a textual sentence, whereas if the size of the list is large it may be desired to output the list as an enumerated list (e.g., a bulleted list, numbered list, a list where list elements are separated by line breaks, or any other type of enumerated list). The inventor has further appreciated that when using a template to generate text from a list, the size of the list may not be known at the time the template is written. Thus, some embodiments relate to automatically formatting lists based on their size.

For example, it may be desired to include, in a template, a sentence that says, "We recommend that you buy this computer because <ListofReasons>," where the tag <ListofReasons> is a list of reasons to buy the computer. If the list of reasons is small, it may be desired to generate this sentence as a textual sentence as shown below in Table 3 below. However, if the list of reasons is large, it may be desired to generate this sentence as an enumerated list, as shown in Table 4 below.

TABLE 3

We recommend that you buy this computer because it is inexpensive and it is the best-selling model.

TABLE 4

We recommend that you buy this computer because:
it is inexpensive;
it is the best-selling model;
it is durable;
it has a five-year warranty;
it has a DVD drive;
it has a large storage capacity;
we will not charge your for shipping.

Thus, some embodiments relate to determining the size of a list of elements and automatically generating text for the list, wherein the formatting of the text depends on the size of the list. This may be done in any suitable way, as the invention is not limited in this respect.

In some embodiments, an enumeration tag may be used in a template that identifies a list of elements and that specifies formatting information for the list. A template processor (e.g., template processor 101) may use the formatting information to generate text from the identified list in the appropriate format. This may be done in any suitable way, as the invention is not limited in this respect.

The enumeration tag may specify any suitable formatting information, as the invention is not limited in this respect. For example, in some embodiments, the enumeration tag may specify a threshold number of elements in the list, above which the list should be formatted as an enumerated list rather than a textual sentence.

In some embodiments, the enumeration tag may specify a threshold number of words above which the list is truncated, such that the elements in the list that would cause the output text to exceed the threshold are omitted. For example, if the tag specifies a threshold of twenty-five words and the list has five elements, but the fourth and fifth elements, if included in the list, would cause the output text to exceed twenty-five words, the fourth and fifth elements may be omitted from the list.

Any other suitable formatting information may be included, such as, for example, the introductory text for the textual sentence list format (e.g., "you have bought"), the introductory text for the enumerated list format (e.g., "you have bought the following items:"), and formatting information for elements in the enumerated list format, such as the punctuation that should follow each list element other than the last, the punctuation that should follow the last list element, whether the first letter of each list element should be capitalized, and/or any other suitable formatting information.

In some embodiments, if the template processor needs information to format the list that is not specified in the enumeration tag, the template processor may use default values. For example, the template processor may use default values for the threshold number of elements in a list above which the list should be formatted as an enumerated list rather than a textual sentence and/or the threshold number of words in the output text for an enumeration tag above which the list is to be truncated. Any suitable threshold values may be used as the default values, as the invention is not limited in this respect. For example, in some embodiments, the default threshold value for the number of elements in a list may be three, and the default threshold value for the total number of words in the output text may be twenty-five. Default values for other formatting information may also be specified. For example, default values for the punctuation that should follow each enumerated list element, for the punctuation that should follow the last enumerated list element, and/or for whether the first letter of each enumerated list element should be capitalized may be specified.

The default values may be specified in any suitable way, as the invention is not limited in this respect For example, in some embodiments parameter(s) 107 may specify the default values for list formatting. In other embodiments, the default values for list formatting may be hard-coded into the logic of the template processor.

An example of an enumeration tag is shown below in Table 5 below. In the example of Table 5, the enumeration tag identifies a list of elements to be formatted (i.e., purchaseList). This list of elements may be provided to the template processor in any suitable way, as the invention is not limited in this respect. For example, this list of elements may be included in input data 105 or in parameter(s) 107. The tag may also specify the text that is to begin the list if the list is a textual sentence (i.e., "You have bought") and may specify that this sentence is to end with a period.

The tag also may also specify formatting information if the list is to be an enumerated list. In this example, the formatting information for the enumerated list specifies that the list is to begin with the text, "You have bought these items:" and that each item in the list ends with a semicolon, except for the last item in the list which ends in a period. The formatting information also specifies that the first letter of each element in the list is to be capitalized. In the example shown in Table 5, the enumeration tag does not specify threshold limits for the number of elements in the list or number of words in the textual sentence. Thus, the template processor may use default values for these thresholds when determining whether the list is to be formatted as a textual sentence or enumerated list.

TABLE 5 enumeration(
    purchaseList,
    _START,     "you have bought",
    _END,     ".",
    _BULLET_BEGIN_SUFFIX,     "these items:",
    _BULLET_DEFAULT_SUFFIX,     ";",
    _BULLET_CAPITALIZE
)

Table 6 below shows another example of an enumeration tag. Like the tag in Table 5, the tag in Table 6 identifies a list of elements and provides formatting information for both the textual sentence form of the list and the enumerated form of the list. However, in this example, the tag also specifies a threshold for the total number of words that the output text is permitted to have (i.e., _MAX_WORDS). Thus, in the example of Table 6, if the identified list is long enough such that it would exceed twenty-five words, the list elements that would cause the output text to exceed this threshold are omitted.

TABLE 6 enumeration(
    salesPointList,
    _START,     "you should buy this computer because",
    _START_IF_0_ITEMS,     "you should not buy this computer",
    _END,     ".",
    _ITEM_DEFAULT_SEPARATOR,     ", because",
    _ITEM_END_SEPARATOR,     " and because",
    _MAX_ITEMS_BY_SENTENCE,     3,
    _BULLET_THRESHOLD,     3,
    _BULLET_BEGIN_SUFFIX,     ":"
    _MAX_WORDS,     25
)

For example, if the list salesPointList has the elements: "it has the largest hard drive of its category," "it is inexpensive," "the quality is good," and "it is the best selling model," the tag in Table 6 would produce the text, "You should buy this computer because it has the largest hard drive of its category, because it is inexpensive and because the quality is good." The last element in the list (i.e., "it is the best selling model") causes the list to exceed twenty-five words, so it is omitted from the list. Moreover, the enumeration tag in Table 6 specifies that the maximum number of items in the textual sentence form of the list (i.e., _MAX_ITEMS_BY_SENTENCE) is three items. Because in this example the list has three items, it is formatted as a textual sentence.

If the list salesPointList has the elements: "it is gold plated," "it is cheap," "the quality is good," and "it is our best seller," the enumeration tag in Table 6 would produce the following text:

You should buy this computer because:
it is gold plated
it is cheap
the quality is good
it is our best seller In this example, the output text has less than twenty-five words, so all list elements are included in the output text. Moreover, because the list has more than three elements, it is formatted in enumerated form, rather than in textual sentence form.

In some embodiments, an enumeration tag may be used to personalize list text based on the preferences of the intended reader. This may be done in any suitable way, as the invention is not limited in this respect.

For example, it may be desired to generate text that includes a sales pitch to a potential customer, but that is customized based on the concerns that are of primary importance to the customer. For example, for a customer whose primary concerns are performance and price, it may be desired for the generated text to read, "You told us that your main concerns are about performance and price. This model is often bought by professional users directly concerned with performance, because it has a very big hard drive and because the screen is very large. Furthermore, for this level of performance, the price is highly competitive: it is the cheaper model in its category and moreover we have a special offer on this model this month." If the customer's primary concerns are quality and performance, it may be desired for the generated text to read, "You told us that your main concerns are about quality and performance. This model has a high-level of quality: this product has a five-year warranty, the screen has bright colors, and the brand is well-known for its professional design. Considering this level of quality, the price is highly competitive: it is the cheaper model in its category and moreover we have a special offer on this model this month."

Thus, in some embodiments, an enumeration tag may be used wherein the list elements that go into the generated text are dependent on a condition specified in the enumeration tag. For example, in the example above, the elements that go into the list are dependent on the primary concerns of the potential customer.

Table 7 below shows examples of enumeration tags that may be used to generate text based on a customer's concerns. The first enumeration tag generates a list of the customers concerns that are specified in "theCustomer.mainConcerns" parameter, preceded by introductory text. The second enumeration tag generates a list of reasons why the customer should buy the particular product that is dependent on the main concerns of the customer. That is, the list salesPointList includes a list of sales points and identifies whether each of these pertains to performance, quality, or price. For example, salesPointList may include the following information:

price
   a. it is the cheaper model in its category
   b. we have a special offer on this model this month
quality
   c. this product has a five-year warranty
   d. the screen has bright colors
   e. the brand is well-known for its professional design
performance
   f. it has a very big hard drive
   g. the screen is very large The enumeration tag includes only those list elements in the output text that pertain to the concerns of the customer. Moreover, the enumeration tag specifies introductory text for each topic (i.e., for each customer concern) and linking text for each topic that may be used depending on which topic precedes it in the list.

TABLE 7

```
enumeration (
        theCustomer.mainConcerns,
        _START,
                \(
                        you told us that your main
                        /* "concern is" or "concerns are" */
                        \agree("concern", theCustomer.mainConcerns.size)
                        \verb(toBe, present, theCustomer.mainConcerns.size)
                        about
                \)
        _END,                                                     ":",
        _ITEM_DEFAULT_SEPARATOR,                                  ";",
        _ITEM_END_SEPARATOR,                             "and",
)
enumeration (
        salesPointList,
        _TOPICS,        theCustomer.mainConcerns,
        _TOPIC_OUTPUT,     "performance",
                _START, "this model is often bought by professional users directly
concerned with performance, because"
                        _ITEM_DEFAULT_SEPARATOR,          ", because",
                        _ITEM_END SEPARATOR,                     "and because",
                _END, ".",
                _TOPIC_INTRODUCTION,
                        [
                                "price", "even if the price is competitive, ",
                                "quality", "in addition to its quality, "
                        ],
        _TOPIC_OUTPUT,     "price",
                _START,        "the price is highly competitive:"
                _ITEM_DEFAULT_SEPARATOR,                 "and",
                _ITEM_END_SEPARATOR,                        "and moreover",
                _END, ".",
                _TOPIC_INTRODUCTION,
                        [
```

TABLE 7-continued

```
                         "performance",      "furthermore, for this level of
performance,",
                         "quality",          "considering this level of quality,"
                ],
       _TOPIC_OUTPUT,    "quality",
              _START,            "this model has a high-level of quality:"
              _ITEM_DEFAULT_SEPARATOR,              ";",
              _ITEM_END_SEPARATOR,                  ", and",
              _END, ".",
              _TOPIC_INTRODUCTION,
                     [
                         "performance",      "in addition to its performance, ",
                         "price",            "even if the price is low, "
                     ]
)
```

Figure 5:
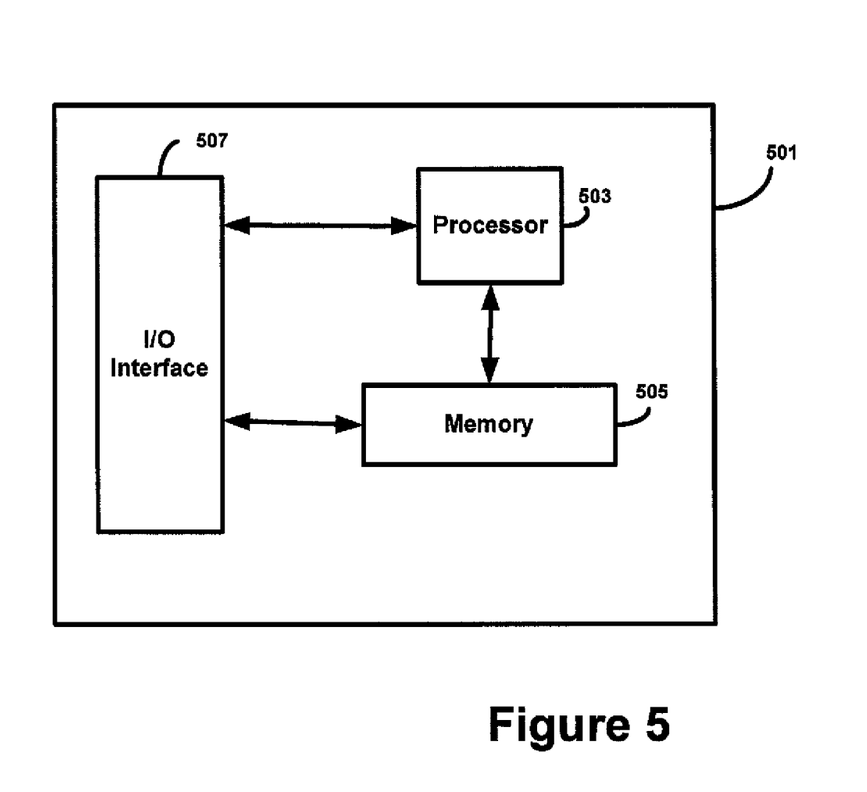
FIG. 5 is a block diagram of a computer system upon which some embodiments may be implemented.

The above-described embodiments may be implemented on any suitable computer system. One example of a computer system in which some embodiments may be implemented is shown in FIG. 5. In FIG. 5, computer system 501 includes a processor 503, a memory 505, and an input/output (I/O) interface 507. Memory 505 may store computer instructions that, when executed, perform embodiments of the invention, and processor 503 may access memory 505 and execute these instructions. I/O interface 507 may include any type of I/O device for interfacing with a user or other computer system. For example, I/O interface may include I/O devices such as a mouse or keyboard via which a user may input information to processor 503 and memory 505, a display via which the computer system may display information to a user, a network port via which the computer system may communicate with one or more other computer system, and/or any other suitable I/O device.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, to performs the above-discussed functions of the embodiments of the present invention. The computer-readable medium can be transportable such that the program stored thereon can be loaded onto any computer environment resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

It should be appreciated that in accordance with several embodiments of the present invention wherein processes are implemented in a computer readable medium, the computer implemented processes may, during the course of their execution, receive input manually (e.g., from a user).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting. The invention is limited only as defined by the following claims and the equivalents thereto.

What is claimed is:

1. A method for automatically generating text to present information associated with at least one product to a customer, the method comprising:
   using at least one processor to perform:
      accessing a template that specifies at least one list of sales points associated with one or more characteristics of the at least one product, wherein the at least one list of sales points comprises a plurality of groups of sales points comprising at least a first group of sales points associated with a first category of product characteristics and a second group of sales points associated with a second category of product characteristics, and wherein the template further specifies first language for presenting sales points associated with the first category and second language for presenting sales points associated with the second category, wherein the first language is different from the second language, wherein each sales point in the at least one list of sales points comprises two or more words;
      identifying, in the at least one list of sales points, a first sales point indicative of the customer's preferences;
      identifying additional language to be presented with the first sales point by determining a group of sales points in the plurality of groups of sales points to which the first sales point belongs;
      determining a format for the determined group of sales points at least in part by determining, based on a characteristic of the determined group of sales points, whether the determined group of sales points should be formatted as an enumerated list forming at least part of a single sentence or as at least a part of a single textual sentence; and automatically generating output text including the determined group of sales points including the first sales point, and the additional language identified to be presented with the first sales point, the determined group of sales points being formatted according to the determined format.

2. The method of claim 1, wherein the first language comprises first introductory language, the second language comprises second introductory language, and wherein:

identifying additional language to be presented with the first sales point comprises identifying introductory language to be presented with the first sales point by:

identifying the first introductory language as the introductory language to be presented with the first sales point when the first sales point is determined to be in the first group of sales points, and identifying the second introductory language as the introductory language to be presented with the first sales point when the first sales point is determined to be in the second group of sales points; and automatically generating the output text comprises generating the output text such that the identified introductory language precedes the first sales point in the generated output text.

3. The method of claim 1, wherein the first language comprises first element-separating language and the second language comprises second element-separating language, the method further comprising:

identifying, in the at least one list of sales points, a second sales point indicative of the customer's preferences, wherein the second sales point is in a same group of sales points as the first sales point, wherein identifying additional language to be presented with the first sales point comprises identifying element-separating language to be presented with the first sales point and the second sales point by:

identifying the first element-separating language as the element-separating language when the first sales point is determined to be in the first group of sales points, and identifying the second element-separating language as the element-separating language when the first sales point is determined to be in the second group of sales points; and wherein automatically generating the output text comprises generating the output text such that the element-separating language appears between the first sales point and the second sales point in the generated output text.

4. The method of claim 1, the method further comprising identifying, in the at least one list of sales points, a second sales point indicative of the customer's preferences, wherein the second sales point is in a different group of sales points from the first sales point, wherein identifying additional language to be presented with the first sales point comprises identifying linking text for linking sales points in different groups, and wherein automatically generating the output text comprises generating the output text such that the linking text appears between the first sales point and the second sales point in the generated output text.

5. The method of claim 4, wherein identifying the linking text comprises identifying linking text for linking the first sales point to the second sales point based on which of the plurality of groups the first sales point belongs to and which of the plurality of groups the second sales point belongs to.

6. The method of claim 5, wherein identifying the first sales point indicative of the customer's preferences comprises:

identifying a sales point in the first group associated with the first category of product characteristics as the first sales point based on an indication that the customer prioritizes sales points in the first category of product characteristics, and identifying a sales point in the second group associated with the second category of product characteristics as the first sales point based on an indication that the customer prioritizes sales points in the second category of product characteristics.

7. The method of claim 1, wherein the template further comprises at least one tag that specifies the at least one list of sales points.

8. The method of claim 1, wherein the first category is a category selected from the group of categories consisting of price, performance, and quality.

9. An article of manufacture comprising at least one non-transitory computer readable medium encoded with instructions that, when executed by at least one processor, cause the at least one processor to perform a method for automatically generating text to present information associated with at least one product to a customer, the method comprising:

accessing a template that specifies at least one list of sales points associated with one or more characteristics of the at least one product, wherein the at least one list of sales points comprises a plurality of groups of sales points comprising at least a first group of sales points associated with a first category of product characteristics and a second group of sales points associated with a second category of product characteristics, and wherein the template further specifies first language for presenting sales points associated with the first category and second language for presenting sales points associated with the second category, wherein the first language is different from the second language, wherein each sales point in the at least one list of sales points comprises two or more words;

identifying, in the at least one list of sales points, a first sales point indicative of the customer's preferences;

identifying additional language to be presented with the first sales point by determining a group of sales points in the plurality of groups of sales points to which the first sales point belongs;

determining a format for the determined group of sales points at least in part by determining, based on a characteristic of the determined group of sales points, whether the determined group of sales points should be formatted as an enumerated list forming at least part of a single sentence or as at least a part of a single textual sentence; and automatically generating output text including the determined group of sales points including the first sales point, and the additional language identified to be presented with the first sales point, the determined group of sales points being formatted according to the determined format.

10. The article of manufacture of claim 9, wherein the first language comprises first introductory language, the second language comprises second introductory language, and wherein:

identifying additional language to be presented with the first sales point comprises identifying introductory language to be presented with the first sales point by:

identifying the first introductory language as the introductory language to be presented with the first sales point when the first sales point is determined to be in the first group of sales points, and identifying the second introductory language as the introductory language to be presented with the first sales point when the first sales point is determined to be in the second group of sales points; and automatically generating the output text comprises generating the output text such that the identified introductory language precedes the first sales point in the generated output text.

11. The article of manufacture of claim 9, wherein the first language comprises first element-separating language and the second language comprises second element-separating language, wherein the method further comprises identifying, in the at least one list of sales points, a second sales point indicative of the customer's preferences, wherein the second sales point is in a same group of sales points as the first sales point, wherein identifying additional language to be presented with the first sales point comprises identifying element-separating language to be presented with the first sales point and the second sales point by:

identifying the first element-separating language as the element-separating language when the first sales point is determined to be in the first group of sales points, and identifying the second element-separating language as the element-separating language when the first sales point is determined to be in the second group of sales points; and wherein automatically generating the output text comprises generating the output text such that the element-separating language appears between the first sales point and the second sales point in the generated output text.

12. The article of manufacture of claim 9, wherein the method further comprises identifying, in the at least one list of sales points, a second sales point indicative of the customer's preferences, wherein the second sales point is in a different group of sales points from the first sales point;

wherein identifying additional language to be presented with the first sales point comprises identifying linking text for linking sales points in different groups; and wherein automatically generating the output text comprises generating the output text such that the linking text appears between the first sales point and the second sales point in the generated output text.

13. The article of manufacture of claim 12, wherein identifying the linking text comprises identifying linking text for linking the first sales point to the second sales point based on which of the plurality of groups the first sales point belongs to and which of the plurality of groups the second sales point belongs to.

14. The article of manufacture of claim 13, wherein identifying the first sales point indicative of the customer's preferences comprises:

identifying a sales point in the first group associated with the first category of product characteristics as the first sales point based on an indication that the customer prioritizes sales points in the first category of product characteristics, and identifying a sales point in the second group associated with the second category of product characteristics as the first sales point based on an indication that the customer prioritizes sales points in the second category of product characteristics.

15. A system for automatically generating text to present information associated with at least one product to a customer, the system comprising:

at least one processor configured to:

access a template that specifies at least one list of sales points associated with one or more characteristics of the at least one product, wherein the at least one list of sales points comprises a plurality of groups of sales points comprising at least a first group of sales points associated with a first category of product characteristics and a second group of sales points associated with a second category of product characteristics, and wherein the template further specifies first language for presenting sales points associated with the first category and second language for presenting sales points associated with the second category, wherein the first language is different from the second language, wherein each sales point in the at least one list of sales points comprises two or more words;

identify, in the at least one list of sales points, a first sales point indicative of the customer's preferences;

identify additional language to be presented with the first sales point by determining a group of sales points in the plurality of groups of sales points to which the first sales point belongs;

determine a format for the determined group of sales points at least in part by determining, based on a characteristic of the determined group of sales points, whether the determined group of sales points should be formatted as an enumerated list forming at least part of a single sentence or as at least a part of a single textual sentence; and generate output text including the determined group of sales points including the first sales point, and the additional language identified to be presented with the first sales point, the determined group of sales points being formatted according to the determined format.

16. The system of claim 15, wherein the first language comprises first introductory language, the second language comprises second introductory language, and wherein the at least one processor is configured to identify additional language to be presented with the first sales point at least by:

identifying the first introductory language as the introductory language to be presented with the first sales point when the first sales point is determined to be in the first group of sales points; and identifying the second introductory language as the introductory language to be presented with the first sales point when the first sales point is determined to be in the second group of sales points; and wherein the at least one processor is configured to generate the output text such that the identified introductory language precedes the first sales point in the generated output text.

17. The system of claim 15, wherein the first language comprises first element-separating language and the second language comprises second element-separating language, and wherein the at least one processor is further configured to identify, in the at least one list of sales points, a second sales point indicative of the customer's preferences, wherein the second sales point is in a same group of sales points as the first sales point, wherein the at least one processor is configured to identify additional language to be presented with the first sales point at least by identifying element-separating language to be presented with the first sales point and the second sales point by:
  identifying the first element-separating language as the element-separating language when the first sales point is determined to be in the first group of sales points, and
  identifying the second element-separating language as the element-separating language when the first sales point is determined to be in the second group of sales points; and
wherein the at least one processor is configured to generate the output text such that the element-separating language appears between the first sales point and the second sales point in the generated output text.

18. The system of claim 15, wherein the at least one processor is further configured to identify, in the at least one list of sales points, a second sales point indicative of the customer's preferences, wherein the second sales point is in a different group of sales points from the first sales point;
  wherein the at least one processor is configured to identify additional language to be presented with the first sales point at least by identifying linking text for linking sales points in different groups; and
  wherein the at least one processor is configured to generate the output text such that the linking text appears between the first sales point and the second sales point in the generated output text.

19. The system of claim 18, wherein the at least one processor is configured to identify the linking text by identifying linking text for linking the first sales point to the second sales point based on which of the plurality of groups the first sales point belongs to and which of the plurality of groups the second sales point belongs to.

20. The system of claim 19, wherein the at least one processor is configured to identify the first sales point indicative of the customer's preferences at least by:
  identifying a sales point in the first group associated with the first category of product characteristics as the first sales point based on an indication that the customer prioritizes sales points in the first category of product characteristics; and
  identifying a sales point in the second group associated with the second category of product characteristics as the first sales point based on an indication that the customer prioritizes sales points in the second category of product characteristics.

* * * * *

UNITED STATES PATENT AND TRADEMARK OFFICE
CERTIFICATE OF CORRECTION

PATENT NO.         : 9,164,982 B1                                    Page 1 of 1
APPLICATION NO.    : 13/465261
DATED              : October 20, 2015
INVENTOR(S)        : Alain Kaeser It is certified that error appears in the above-identified patent and that said Letters Patent is hereby corrected as shown below:

On the Title page of the patent, in item (73) Assignee:

Please replace "Lyons" with --Lyon--.

Signed and Sealed this
Twenty-second Day of March, 2016

Michelle K. Lee
*Director of the United States Patent and Trademark Office*